United States Patent
Lee et al.

(10) Patent No.: US 12,158,809 B2
(45) Date of Patent: Dec. 3, 2024

(54) ELECTRONIC DEVICE MANAGING CORRECTED ERROR AND OPERATING METHOD OF ELECTRONIC DEVICE

(71) Applicant: Samsung Electronics Co., Ltd., Suwon-si (KR)

(72) Inventors: Ho-Young Lee, Suwon-si (KR); Sung-Joon Kim, Suwon-si (KR); Ilho Kim, Suwon-si (KR); Kyungjin Park, Suwon-si (KR); Changho Yun, Suwon-si (KR); Jinhun Jeong, Suwon-si (KR); Insu Choi, Suwon-si (KR); Kyung-Hee Han, Suwon-si (KR); Yukyoung Kim, Suwon-si (KR); Jinwoo Kim, Suwon-si (KR); Chaeeun Lee, Suwon-si (KR); Yunmi Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/295,457

(22) Filed: Apr. 4, 2023

(65) Prior Publication Data

US 2024/0004757 A1    Jan. 4, 2024

(30) Foreign Application Priority Data

Jul. 4, 2022   (KR) .......................... 10-2022-0081584

(51) Int. Cl.
*G06F 11/10*   (2006.01)
*G06F 11/07*   (2006.01)

(52) U.S. Cl.
CPC ........ *G06F 11/1068* (2013.01); *G06F 11/076* (2013.01); *G06F 11/0793* (2013.01)

(58) Field of Classification Search
CPC .............. G06F 11/1068; G06F 11/076; G06F 11/0793; G06F 11/073; G06F 11/1048
See application file for complete search history.

(56) References Cited

U.S. PATENT DOCUMENTS

| | | | |
|---|---|---|---|
| 6,940,765 | B2 | 9/2005 | Kyung |
| 7,734,980 | B2 | 6/2010 | Alexander et al. |
| 8,041,990 | B2 | 10/2011 | O'Connor et al. |
| 8,245,105 | B2 | 8/2012 | Dell et al. |

(Continued)

FOREIGN PATENT DOCUMENTS

| | | |
|---|---|---|
| KR | 10-0505702 B1 | 8/2005 |
| KR | 10-2018-0070779 A | 6/2018 |

(Continued)

*Primary Examiner* — Thien Nguyen
(74) *Attorney, Agent, or Firm* — Harness, Dickey & Pierce, P.L.C.

(57) ABSTRACT

Disclosed is an electronic device including a memory module that includes at least one dynamic random access memory, and a processor configured to access the memory module, determine a corrected error count associated with an address of a corrected error in response to the corrected error being detected when data are read from the memory module, read an error log associated with the corrected error, determine a risk level of the corrected error based on the error log, and schedule a post package repair (PPR) for the address of the corrected error in response to the risk level of the corrected error being high.

19 Claims, 15 Drawing Sheets

(56) References Cited

U.S. PATENT DOCUMENTS

| | | | |
|---|---|---|---|
| 8,549,378 B2 | 10/2013 | Alves et al. | |
| 9,230,669 B2 | 1/2016 | Jung et al. | |
| 9,343,184 B2 | 5/2016 | Wilson et al. | |
| 9,922,729 B2 | 3/2018 | Wilson et al. | |
| 10,558,521 B2 | 2/2020 | Sankaranarayanan et al. | |
| 10,725,671 B2 | 7/2020 | Shah et al. | |
| 2017/0344414 A1* | 11/2017 | Raj | G06F 11/076 |
| 2018/0173595 A1 | 6/2018 | Kim et al. | |
| 2018/0285197 A1* | 10/2018 | Kim | G06F 11/1048 |
| 2019/0019569 A1* | 1/2019 | Pope | G11C 29/44 |
| 2021/0263868 A1 | 8/2021 | Maddukuri et al. | |
| 2022/0004451 A1* | 1/2022 | Chalfant | G06F 9/5016 |

FOREIGN PATENT DOCUMENTS

| | | |
|---|---|---|
| KR | 10-2174183 B1 | 11/2020 |
| KR | 10-2021-0131443 A | 11/2021 |

\* cited by examiner

ELECTRONIC DEVICE MANAGING CORRECTED ERROR AND OPERATING METHOD OF ELECTRONIC DEVICE

CROSS-REFERENCE TO RELATED APPLICATIONS

This application claims priority under 35 U.S.C. § 119 to Korean Patent Application No. 10-2022-0081584 filed on Jul. 4, 2022, in the Korean Intellectual Property Office, the disclosures of which are incorporated by reference herein in their entireties.

BACKGROUND

Some example embodiments of the inventive concepts described herein relate to an electronic device, and more particularly, relate to an electronic device improving RAS (Reliability, Availability, and Serviceability) based on a corrected error and an operating method of the electronic device.

RAS (Reliability, Availability, and Serviceability) may express the robustness of a computer. As the level of the RAS level becomes higher, the data integrity and fault-tolerance of the computer may be improved. The RAS level of the computer may be improved by in advance detecting various faults capable of occurring in the computer and reducing, or preventing, and/or compensating for the detected faults.

The computer may include a processor and a memory module as main components. The processor may use the memory module as a working memory and a system memory. An error may occur when the processor reads data from the memory module. The error that is detected in the process of reading data from the memory module may include an uncorrected error UE and a corrected error CE. The uncorrected error UE may cause the loss of data.

SUMMARY

Some example embodiments of the inventive concepts provide an electronic device for preventing an uncorrected error (UE) from occurring when a processor reads data from a memory module and an operating method of the electronic device.

According to some example embodiments, an electronic device includes a memory module that includes at least one dynamic random access memory, and a processor configured to access the memory module, determine a corrected error count associated with an address of a corrected error in response to the corrected error being detected when data are read from the memory module, read an error log associated with the corrected error, determine a risk level of the corrected error based on the error log, and schedule a post package repair (PPR) for the address of the corrected error in response to the risk level of the corrected error being high.

According to some example embodiments, an operating method of an electronic device including a processor and a memory module includes performing, at the processor, a read operation on the memory module, performing, at the processor, a read retry operation on the memory module in response to an error occurring in the read operation, determining, at the processor, a risk level of a corrected error, based on whether the corrected error occurs in any read phase of the read retry operation, and scheduling, at the processor, a post package repair (PPR) of the memory module based on an address of the corrected error in response to the risk level of the corrected error being high.

According to some example embodiments, an electronic device includes a basic input output system (BIOS) device that includes a nonvolatile memory storing a BIOS, a storage device that stores an operating system, a chipset that is connected with the BIOS device and the storage device, a memory module that includes at least one dynamic random access memory, and a processor that is connected with the chipset and the memory module. In a power-on, the processor is configured to load the BIOS from the BIOS device through the chipset, and load the operating system from the storage device through the chipset. In response to a corrected error occurring when the processor accesses the memory module, the BIOS and/or the processor is configured to determine a risk level of the corrected error by reading an error log of the corrected error, and register an address of the corrected error at a post package repair (PPR) address list regardless of a corrected error count of the corrected error in response to the risk level of the corrected error being high.

BRIEF DESCRIPTION OF THE FIGURES

The above and other objects and features of the inventive concepts will become apparent by describing in detail some example embodiments thereof with reference to the accompanying drawings.

DETAILED DESCRIPTION

Below, some example embodiments of the inventive concepts will be described in detail and clearly to such an extent that an ordinary one in the art easily implements the inventive concepts. Below, the term "and/or" is interpreted as including any one of items listed with regard to the term, or a combination of some of the listed items.

Figure 1:
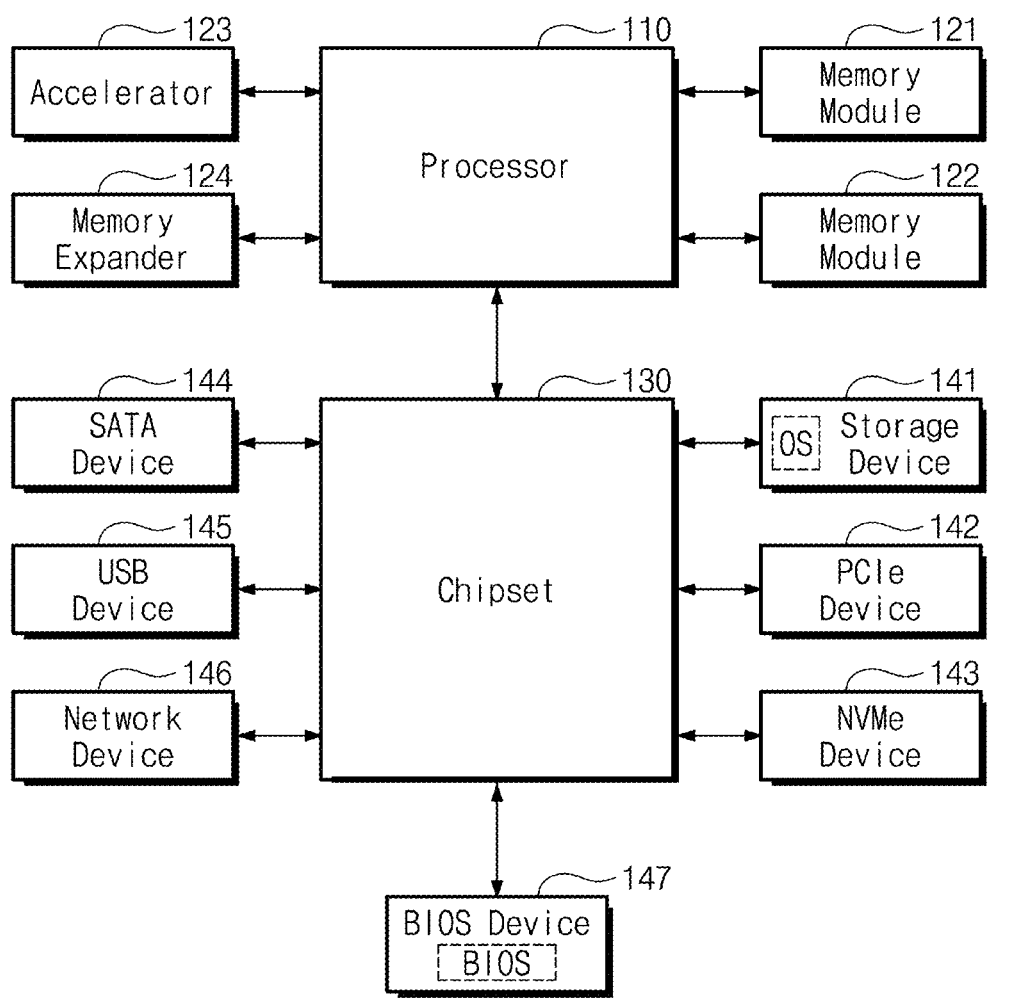
FIG. 1 is a diagram illustrating an electronic device according to some example embodiments of the inventive concepts.

FIG. 1 illustrates an electronic device 100 according to some example embodiments of the inventive concepts. For example, the electronic device 100 may be implemented with one of various computing devices such as a computer, a server, and/or a workstation. Referring to FIG. 1, the electronic device 100 may include a processor 110, a first memory module 121, a second memory module 122, an accelerator 123, a memory expander 124, a chipset 130, a storage device 141, a PCIe (Peripheral Component Interconnect express) device 142, a NVMe (NonVolatile Memory express) device 143, a SATA (Serial Advanced Technology Attachment) device 144, a USB (Universal Serial Bus) device 145, a network device 146, and/or a BIOS (Basic Input Output System) device 147.

The processor 110 may include two or more cores implemented with a central processing unit (CPU). Also, the processor 110 may include at least one auxiliary core implemented with at least one of various hardware accelerators such as a graphic processing unit (GPU), a digital signal processor (DSP), an image signal processor (ISP), a neural processor, and/or a neuromorphic processor.

Each, or one or more, of the first memory module 121 and/or the second memory module 122 may include at least one dynamic random access memory (DRAM). The first memory module 121 and/or the second memory module 122 may be used as a main memory of the electronic device 100. The first memory module 121 and the second memory module 122 may operate based on the DDR (Double Data Rate) DIMM (Dual In-line Memory Module) standard.

The processor 110 may include a memory controller configured to control the first memory module 121 and/or the second memory module 122. The processor 110 may use the first memory module 121 and/or the second memory module 122 as a main memory. The processor 110 may store data necessary, or sufficient, to drive the electronic device 100 and user data generated by the user of the electronic device 100 in the main memory (e.g., temporarily, for buffering, or for caching).

The accelerator 123 may be configured to perform a specific kind of processing entrusted by the processor 110. The accelerator 123 may include at least one of various auxiliary processors such as a graphic processing unit (GPU), a digital signal processor (DSP), an image signal processor (ISP), a neural processor, and/or a neuromorphic processor. In some example embodiments, the accelerator 123 may communicate with the processor 110 based on the PCIe standard or based on the CXL (Compute eXpress Link) standard compatible with the PCIe standard.

The memory expander 124 may communicate with the processor 110. The memory expander 124 may expand the capacity of the main memory implemented with the first memory module 121 and/or the second memory module 122. The memory expander 124 may communicate with the processor 110 based on the PCIe standard and/or based on the CXL standard compatible with the PCIe standard.

The chipset 130 may communicate with the processor 110. For example, the chipset 130 may communicate with the processor 110 based on the DMI (Direct Media Interface) standard. The chipset 130 may arbitrate the communications between peripheral components of the electronic device 100 and the processor 110. For example, the chipset 130 may be implemented with a PCH (Platform Controller Hub).

The storage device 141 may communicate with the chipset 130. The storage device 141 may perform various operations, such as a write operation and/or a read operation, in response to a command transferred from the processor 110 through the chipset 130. The storage device 141 may store an operating system OS. The operating system OS stored in the storage device 141 may be executed by the processor 110 depending on the power-on sequence of the electronic device 100 and may drive the electronic device 100.

The storage device 141 may be implemented with a solid state drive including at least one of various nonvolatile memories such as a NAND flash memory, a phase-change memory, a ferroelectric memory, a magnetic memory, and/or a resistive memory. The storage device 141 may communicate with the chipset 130 based on the PCIe and/or NVMe standard.

The PCIe device 142 may include at least one of various devices configured to communicate with the chipset 130 based on the PCIe standard. The NVMe device 143 may include at least one of various devices configured to communicate with the chipset 130 based on the NVMe standard. The SATA device 144 may include at least one of various devices configured to communicate with the chipset 130 based on the SATA standard. The USB device 145 may include at least one of various devices configured to communicate with the chipset 130 based on the USB standard.

The network device 146 may communicate with the chipset 130 and may include a device configured to communicate with an external device wiredly and/or wirelessly. The network device 146 may communicate with the external device based on the Ethernet standard and may be configured to communicate with the chipset 130 based on the PCIe standard.

The BIOS device 147 may communicate with the chipset 130. For example, the BIOS device 147 may communicate with the chipset 130 based on the SPI (Serial Peripheral Interface) standard. The BIOS device 147 may include a nonvolatile memory that stores the BIOS (Basic Input Output System). For example, the BIOS device 147 may store the BIOS in a medium capable of being read, written, and/or erased, such as a flash memory.

The BIOS may initialize the electronic device 100 depending on the power-on sequence of the electronic device 100. For example, the BIOS may include a memory reference code (MRC) configured to initialize, train, and/or set the first memory module 121 and/or the second memory module 122.

When the power is supplied to the electronic device 100, the power-on sequence of the electronic device 100 may be triggered. In the power-on sequence, the processor 110 may read the BIOS from the BIOS device 147 through the chipset 130. The processor 110 may execute the BIOS to initialize the electronic device 100. The BIOS may include boot loader codes for loading the operating system OS. The processor 110 may execute the BIOS and may load the operating system OS from the storage device 141 through the chipset 130. The processor 110 may complete the initialization of the electronic device 100 by executing the operating system OS.

The BIOS is described with reference to FIG. 1, but an object such as an UEFI (Unified Extensible Firmware Interface) may be used instead of the BIOS. The detailed communication standards of the devices associated with the chipset 130 are explicitly described in FIG. 1, but a device that is based on a communication standard, which is not explicitly described with reference to FIG. 1, such as a SAS (Serial Attached SCSI) may be further included to communicate with the chipset 130.

Figure 2:
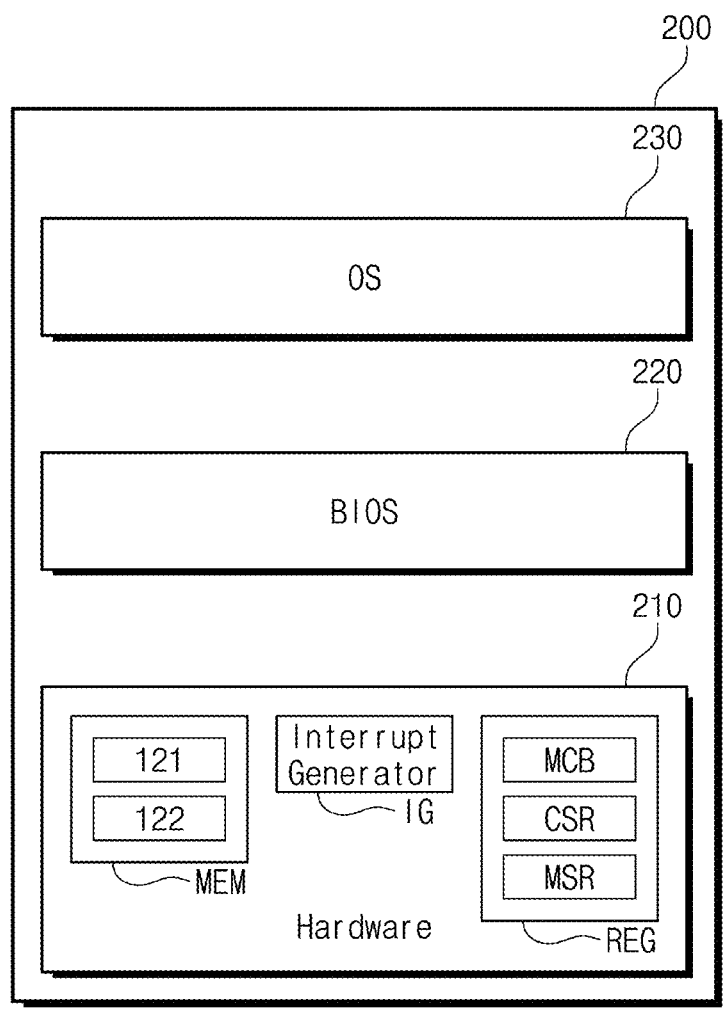
FIG. 2 is a diagram illustrating an electronic device including software layers.

FIG. 2 is a diagram illustrating an electronic device 200 including software layers. Referring to FIGS. 1 and 2, the electronic device 200 may include hardware 210, a BIOS 220, and/or an operating system (OS) 230.

The hardware 210 may include the components of the electronic device 100 illustrated in FIG. 1. In some example embodiments, a main memory MEM, an interrupt generator IG, and/or registers REG are illustrated as the components of the hardware 210.

The main memory MEM may be implemented to include the first memory module 121 and/or the second memory module 122. In some example embodiments, the main memory MEM may be implemented to further include the memory expander 124.

The interrupt generator IG may be regarded as collectively representing a plurality of interrupt generators respectively included in the components of the electronic device 100 (e.g., provided inside or outside the processor 110). The interrupt generator IG may generate an interrupt that is identified by the BIOS 220 driven by the processor 110.

The registers REG may include a plurality of registers belonging to the processor 110. The registers REG may include an MCB (Machine Check Bank), a CSR (Control and Status Register), and/or an MSR (Model-Specific Register).

The MCB may be used to store information obtained by the machine check, for example, error information. The CSR may be used to store instructions and/or information of states corresponding to the instructions. The MSR may be used for debugging, tracing of program execution, and/or monitoring of performance.

The BIOS 220 may transfer the instructions from the operating system 230 to the hardware 210. The BIOS 220 may process an interrupt from the hardware 210 or may transfer the interrupt from the hardware 210 to the operating system 230.

The operating system 230 may transfer various instructions to the hardware 210 through the BIOS 220. The operating system 230 may control and/or access a plurality of hardware by using the instructions. The operating system 230 may support various applications installed in the electronic device 200 by the user and may manage resources.

Figure 3:
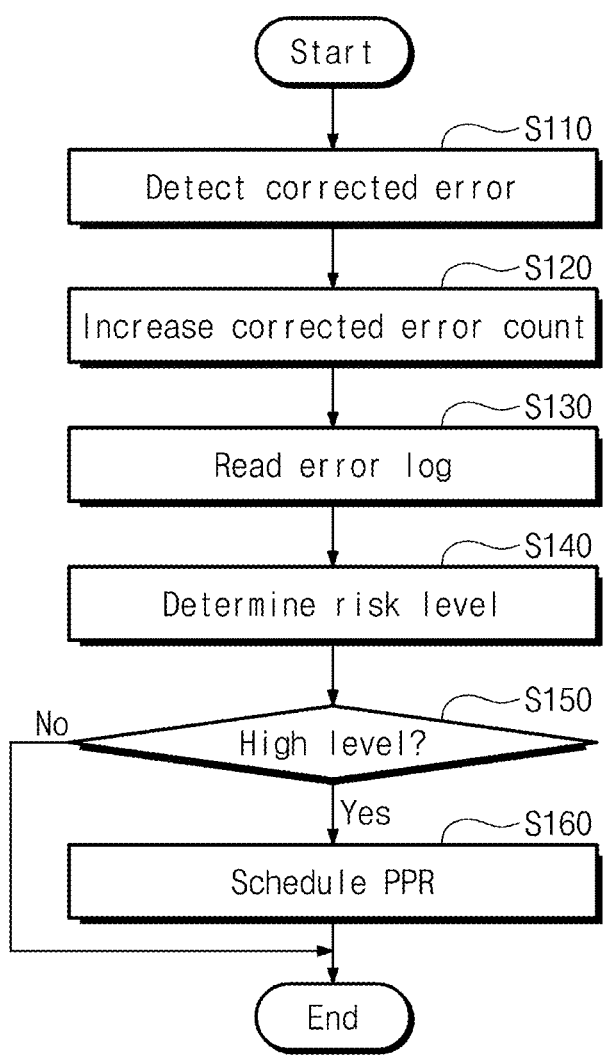
FIG. 3 is a diagram illustrating an operation method of an electronic device according to some example embodiments of the inventive concepts.

FIG. 3 is a diagram illustrating an operating method of the electronic device 100 or 200 according to some example embodiments of the inventive concepts. Referring to FIGS. 1, 2, and 3, in operation S110, the processor 110 may detect a corrected error. For example, a read error may occur when a memory controller in the processor 110 performs the read operation on the first memory module 121 and/or the second memory module 122 by using an address. When the read error is uncorrectable, the read operation may fail.

In response to that the read operation fails, the memory controller in the processor 110 may perform a read retry operation on the first memory module 121 and/or the second memory module 122 by using the same address. When the read retry operation succeeds (e.g., when the error correction succeeds), it may be determined that the data read from the first memory module 121 and/or the second memory module 122 include a corrected error. When the read retry operation fails, it may be determined that the uncorrected error occurs.

That is, when the read retry operation succeeds after the read operation for the first memory module 121 or the second memory module 122 fails, the processor 110 may detect the corrected error.

In operation S120, the processor 110 may increase a corrected error count. For example, the processor 110 may manage the corrected error count in association with an address where the corrected error occurs. When the corrected error occurs at a specific address, the processor 110 may generate the corrected error count of the specific address as an initial value. When the corrected error again occurs at the specific address, the processor 110 may increase the corrected error count of the specific address. The processor 110 may manage corrected error counts corresponding to two or more addresses.

In operation S130, the processor 110 may read an error log. For example, when the corrected error occurs in the first memory module 121 and/or the second memory module 122, a subject (e.g., the memory controller in the processor 110 and/or an upper layer of the memory controller) that performs the read operation or the read retry operation may log error-related information in at least one of the MCB, the CSR, and/or the MSR of the registers REG. The processor 110 may read the error log from at least one of the MCB, the CSR, and/or the MSR of the registers REG.

In operation S140, the processor 110 may determine a risk level. For example, the processor 110 may determine the risk level of the corrected error based on the read error log. The risk level may be determined based on whether the corrected error is temporary or repetitive (or continuous).

In operation S150, when the determined risk level is not a high level (e.g., a low level), the processor 110 may terminate the process without performing the following processing associated with the corrected error. When the determined risk level is the high level, in operation S160, the processor 110 may schedule a post package repair (PPR) associated with the first memory module 121 and/or the second memory module 122, in which the corrected error occurs.

The PPR may include replacing memory cells where the corrected error occurs, by mapping an address of the memory cells, in which the corrected error occurs, from among the memory cells of the first memory module 121 and/or the second memory module 122 to memory cells (e.g., redundant memory cells).

According to some example embodiments of the inventive concepts, the PPR is performed depending on the risk level of the corrected error. Accordingly, as the PPR is performed on the corrected error close in feature to the uncorrected error, the occurrence of the uncorrected error may be reduced, or prevented, and the loss of data and the error of the electronic device 100 or 200 due to loss of data may be reduced, or prevented.

Figure 4:
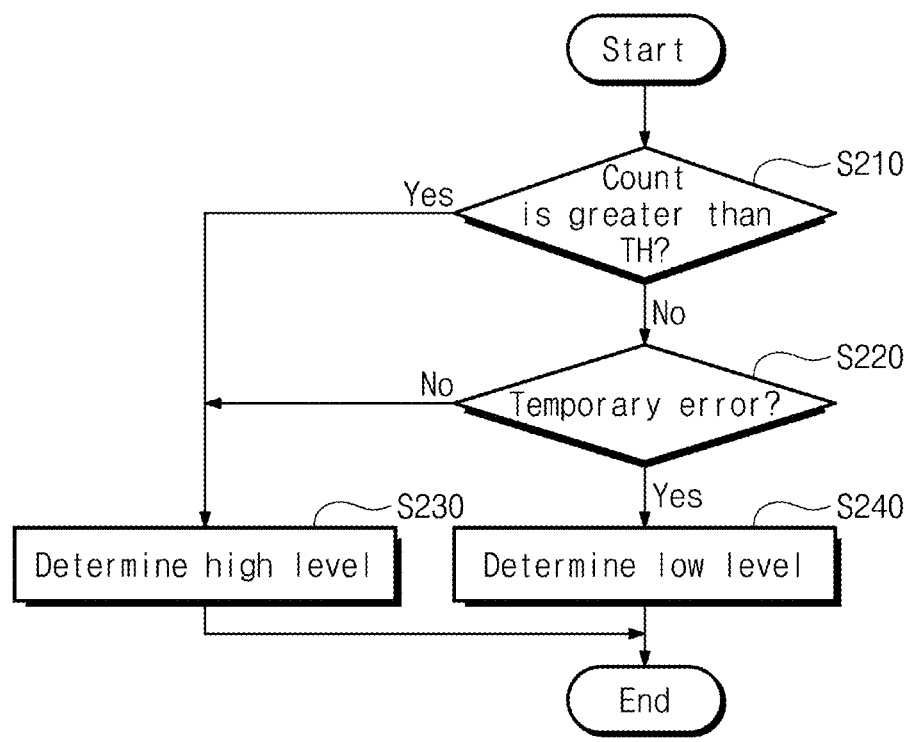
FIG. 4 is a diagram illustrating an example in which an electronic device determines a risk level of a corrected error.

FIG. 4 is a diagram illustrating an example in which the electronic device 100 or 200 determines a risk level of a corrected error. Referring to FIGS. 1, 2, and 4, in operation S210, the processor 110 may determine whether a count is greater than a threshold value TH. For example, the processor 110 may determine whether a corrected error count generated (or obtained) in association with an address where the corrected error occurs is greater than the threshold value TH. When the corrected error count is greater than the threshold value TH, it may be determined that the corrected error occurs repeatedly (or continuously) in memory cells of the address, at which the corrected error occurs, in plural read operations and/or plural read retry operations. Accordingly, in operation S230, the processor 110 may determine the risk level associated with the address to be the high level.

When the corrected error count is not greater than the threshold value TH, in operation S220, the processor 110 may determine whether the corrected error is a temporary error. For example, in the process of performing the read retry operation, the processor 110 may determine whether the corrected error is temporary. When the corrected error is not a temporary error occurring in the current read operation, it may be determined that an error may occur later in the memory cells of the address where the corrected error occurs. Accordingly, in operation S230, the processor 110 may determine the risk level associated with the address to be the high level.

When the corrected error count is not greater than the threshold value TH and when it is determined that the corrected error is an error temporarily occurring in the current read operation, in operation S240, the processor 110 may determine the risk level of the corrected error to be the low level.

Figure 5:
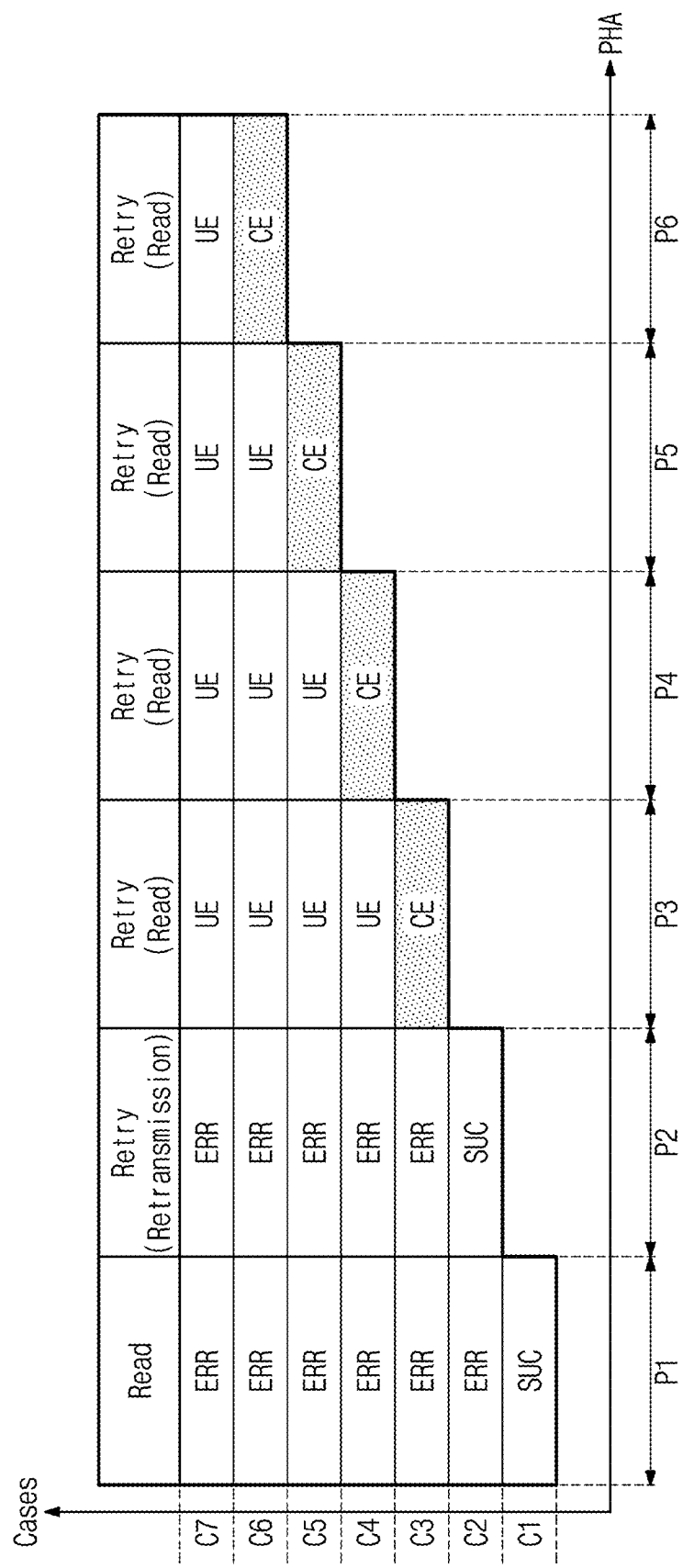
FIG. 5 is a diagram illustrating cases of results obtained when a processor performs a read operation and a read retry operation on a first memory module or a second memory module.

FIG. 5 is a diagram illustrating cases of results obtained when the processor 110 performs the read operation and the read retry operation on the first memory module 121 and/or the second memory module 122. In FIG. 5, a horizontal axis represents a phase PHA, and a vertical axis represents cases.

Referring to FIGS. 1, 2, and 5, the processor 110 may perform read in a first phase P1 and may perform retry, for example, retransmission in a second phase P2. The first phase P1 and the second phase P2 may be included in the read operation. Referring to the first case C1, when the read of the first phase P1 succeeds (SUC), it may be determined that no error occurs in the read operation.

Referring to the second to seventh cases C2 to C7, when an error ERR occurs in the read of the first phase P1, the retransmission may be tried in the second phase P2. In the second phase P2, the first memory module 121 and/or the second memory module 122 may retransmit data, which are read in the read of the first phase P1 and are stored in a buffer, to the processor 110. Referring to the second case C2, when the second phase P2 succeeds (SUC), it may be determined that an error occurs on a channel between the processor 110 and the first memory module 121 and/or the second memory module 122. Accordingly, it may be determined that no error occurs in the read operation.

The processor 110 may retry the read in the third phase P3, the fourth phase P4, the fifth phase P5, and/or the sixth phase P6. The third phase P3, the fourth phase P4, the fifth phase P5, and/or the sixth phase P6 may be included in the read retry operation.

Referring to the third to seventh cases C3 to C7, when the error ERR occurs in the second phase P2, it may be determined that an error occurs in the read operation. The processor 110 (e.g., the memory controller in the processor 110 or an upper layer of the memory controller) may perform the read retry operation.

Referring to the third case C3, when the first read of the read retry operation succeeds and the corrected error CE is detected, it may be determined that an error occurs temporarily in the read of the read operation. Accordingly, when the corrected error CE is detected in the first read of the read retry operation, the risk level of the corrected error CE may be determined to be low.

Referring to the fourth to seventh cases C4 to C7, when an error occurring in the first read of the read retry operation is determined to be the uncorrected error UE, the read may be retried in a next phase. In an embodiment, in the read retry operation, the read may be retried four times until the read succeeds (e.g., until the corrected error CE is detected).

Referring to the fourth to sixth cases C4 to C6, when the read error occurs once or more in the read retry operation, it may be determined that the error occurring in the read of the read operation is not a temporary error. For example, it may be determined that memory cells corresponding to an address of the read operation have factors causing the read error. Accordingly, the corrected error CE may be determined as occurring repeatedly (or continuously), and the risk level of the corrected error CE may be determined to be high.

Referring to the seventh case C7, when all the reads of the read retry operation fail, it may be finally determined that the uncorrected error UE occurs. The uncorrected error UE finally determined may be managed by a separate policy of the processor 110.

In some example embodiments, the number of reads of the read retry operation is not limited. The read retry operation may include performing the read N times (N being a positive integer) until the read succeeds. Also, the criterion for determining the risk level of the corrected error CE is not limited. When the M-th read (M being a positive integer smaller than N) of the read retry operation or a previous read of the M-th read succeeds, the risk level of the corrected error CE may be determined to be low. When the read following the M-th read (M being a positive integer smaller than N) of the read retry operation succeeds, the risk level of the corrected error CE may be determined to be high.

In some example embodiments, when the corrected error CE is detected, information indicating whether the corrected error CE occurs in any read of the read retry operation may be included in the error log. The error log may be recorded in at least one of the MCB, the CSR, and/or the MSR of the registers REG. In some example embodiments, the corrected error count may be included in the error log, and/or may be managed in at least one of the MCB, the CSR, and/or the MSR of the registers REG independently of the error log.

Figure 6:
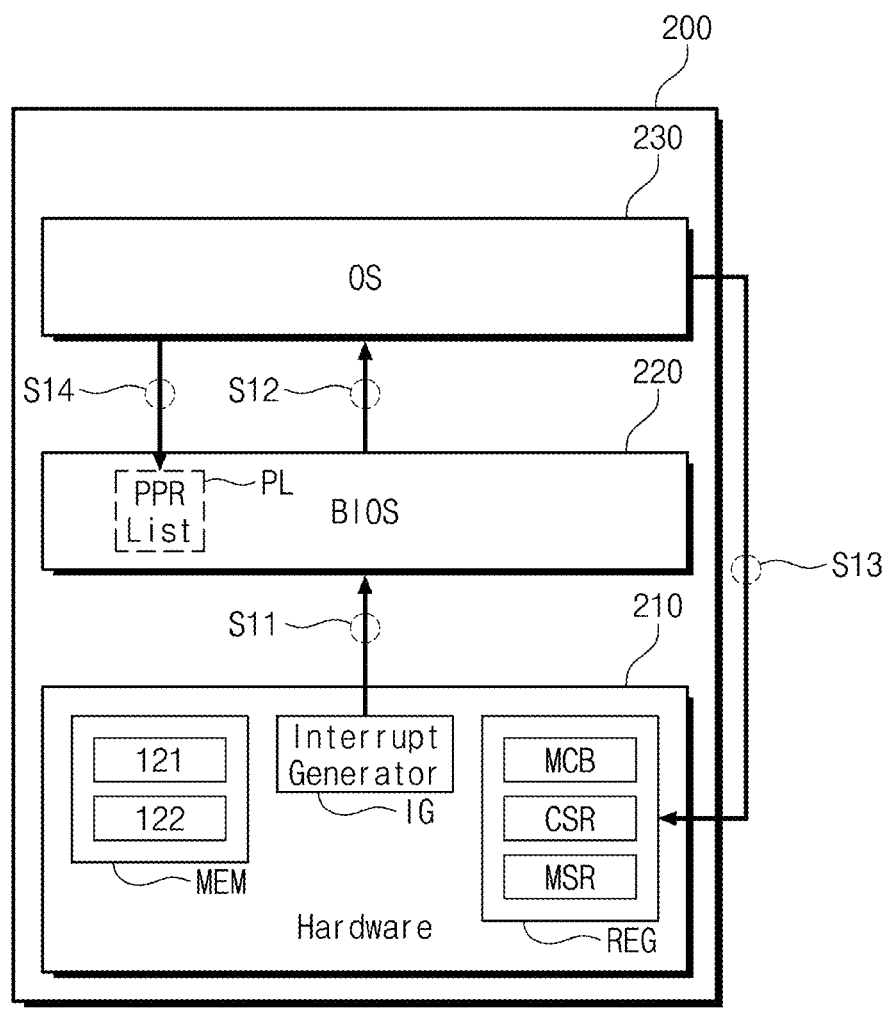
FIG. 6 is a diagram illustrating a first example of a process where an operating method of FIG. 3 is performed in an electronic device of FIG. 2.

FIG. 6 is a diagram illustrating a first example of a process where the operating method of FIG. 3 is performed in the electronic device 200 of FIG. 2. In some example embodiments, an example where the electronic device 200 is implemented based on IA-32 MCA (where IA is an abbreviation of "Intel Architecture" and MCA is an abbreviation of "Machine Check Architecture") is illustrated in FIG. 6.

Referring to FIG. 6, in operation S11, the interrupt generator IG may transfer an interrupt to the BIOS 220. For example, when the corrected error CE occurs in the first memory module 121 and/or the second memory module 122 of the main memory MEM, the interrupt generator IG may transmit the interrupt to the BIOS 220 through the SMI (System Management Interrupt).

As the SMI is received, an SMI handler of the BIOS 220 may be activated. In operation S12, the SMI handler of the BIOS 220 may transmit the CMCI (Corrected Machine Check Interrupt) to the operating system 230. In response to the CMCI, the operating system 230 may detect that the corrected error occurs. When that the corrected error occurs is detected, an MCA handler (or an RAS handler) (where RAS is an abbreviation of "Reliability, Availability, Serviceability") of the operating system 230 may be activated.

In operation S13, the MCA handler (e.g., the CMCI handler or the RAS handler) of the operating system 230 may read the error log and the corrected error count from at least one of the MCB, the CSR, and/or the MSR of the registers REG. As described with reference to FIG. 4, the MCA handler (or the RAS handler) of the operating system 230 may determine the risk level of the corrected error based on the error log and the corrected error count.

When the risk level of the corrected error is low, the MCA handler (or the CMCI handler or the RAS handler) of the operating system 230 may terminate the processing of the corrected error, which is caused by the CMCI. When the risk level of the corrected error is high, in operation S14, the MCA handler (e.g., the CMCI handler or the RAS handler) of the operating system 230 may record the address of the corrected error at a PPR list PL (e.g., a "pprAddrSetup" field) of the BIOS 220.

As the address of the corrected error is recorded at the PPR list PL, the PPR for the address of the corrected error may be scheduled. The MCA handler (e.g., the CMCI handler or the RAS handler) of the operating system 230 may terminate the processing of the corrected error, which is caused by the CMCI.

Figure 7:
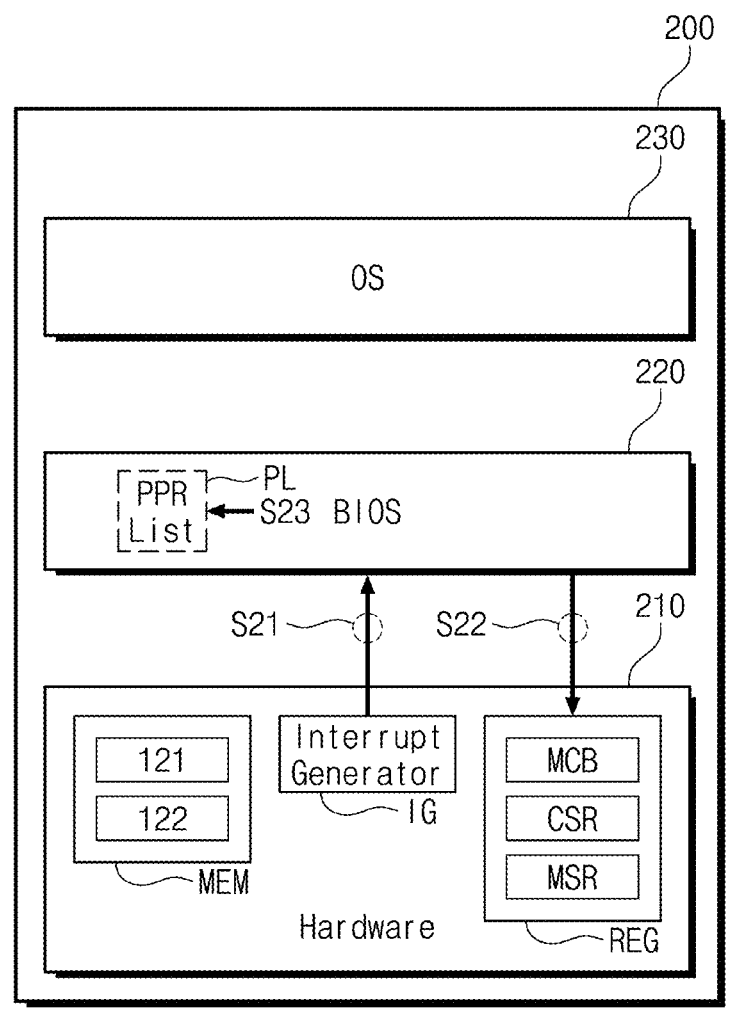
FIG. 7 is a diagram illustrating a second example of a process where an operating method of FIG. 3 is performed in an electronic device of FIG. 2.

FIG. 7 is a diagram illustrating a second example of a process where the operating method of FIG. 3 is performed in the electronic device 200 of FIG. 2. In some example embodiments, an example where the electronic device 200 is implemented based on EMCA (where EMCA is an abbreviation of "Enhanced Machine Check Architecture") is illustrated in FIG. 7.

Referring to FIG. 7, in operation S21, the interrupt generator IG may transfer an interrupt to the BIOS 220. For example, when the corrected error CE occurs in the first memory module 121 and/or the second memory module 122 of the main memory MEM, the interrupt generator IG may transmit the interrupt to the BIOS 220 through the SMI (System Management Interrupt).

As the SMI is received, an SMM handler (where SMM is an abbreviation of "System Management Mode") (or the SMI handler or the RAS handler) of the BIOS 220 may be activated. In operation S22, the SMM handler (or the SMI handler or the RAS handler) of the BIOS 220 may read the error log and the corrected error count from at least one of the MCB, the CSR, and/or the MSR of the registers REG without transmitting the interrupt to the operating system 230. As described with reference to FIG. 4, the SMM handler (or the SMI handler or the RAS handler) of the BIOS 220 may determine the risk level of the corrected error based on the error log and the corrected error count.

When the risk level of the corrected error is low, the SMM handler (or the SMI handler or the RAS handler) of the BIOS 220 may terminate the processing of the corrected error, which is caused by the SMI. When the risk level of the corrected error is high, in operation S23, the SMM handler (or the SMI handler or the RAS handler) of the BIOS 220 may record the address of the corrected error at the PPR list PL (e.g., a "pprAddrSetup" field) of the BIOS 220.

As the address of the corrected error is recorded at the PPR list PL, the PPR for the address of the corrected error may be scheduled. The SMM handler (or the SMI handler or the RAS handler) of the BIOS 220 may terminate the processing of the corrected error, which is caused by the SMI.

Figure 8:
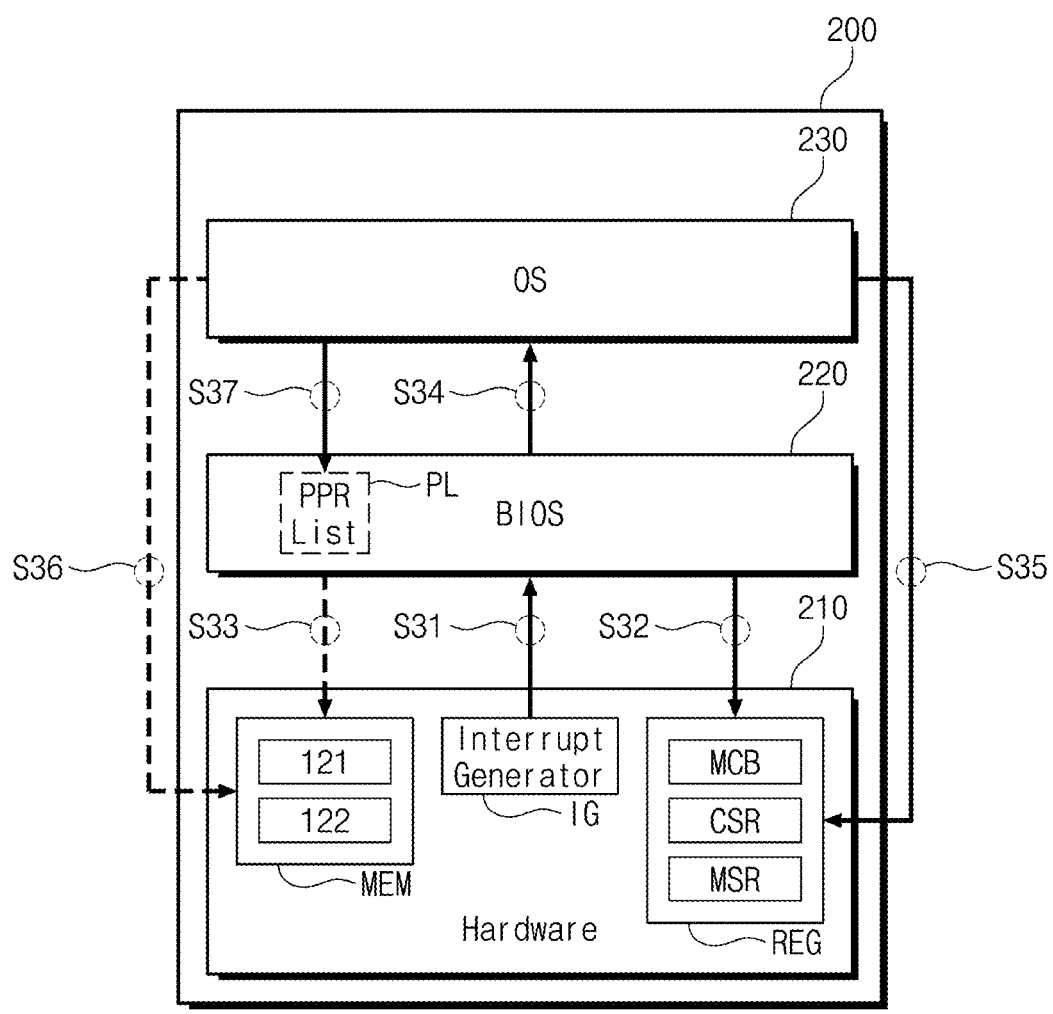
FIG. 8 is a diagram illustrating a third example of a process where an operating method of FIG. 3 is performed in an electronic device of FIG. 2.

FIG. 8 is a diagram illustrating a third example of a process where the operating method of FIG. 3 is performed in the electronic device 200 of FIG. 2. In some example embodiments, an example where the electronic device 200 is implemented based on the EMCA is illustrated in FIG. 8.

Referring to FIG. 8, in operation S31, the interrupt generator IG may transfer an interrupt to the BIOS 220. For example, when the corrected error CE occurs in the first memory module 121 and/or the second memory module 122 of the main memory MEM, the interrupt generator IG may transmit the interrupt to the BIOS 220 through the SMI.

As the SMI is received, the SMI handler of the BIOS 220 may be activated. In operation S32, the SMI handler (or a first RAS handler) of the BIOS 220 may read the error log and/or the corrected error count from at least one of the MCB, the CSR, and/or the MSR of the registers REG.

The access of the operating system 230 to at least some of the MCB, the CSR, and/or the MSR of the registers REG may be limited. In operation S33, the SMI handler (or the first RAS handler) of the BIOS 220 may store information (e.g., information about the corrected error) of the registers, which are prohibited from being accessed by the operating system 230, in the main memory MEM.

In operation S34, the SMI handler (or the first RAS handler) of the BIOS 220 may transmit the CMCI or the SCI (System Control Interrupt) to the operating system 230. In response to the CMCI or the SCI, in operation S35, the MCA (e.g., the CMCI handler or a second RAS handler) of the operating system 230 may read the error log and the corrected error count from at least one of the MCB, the CSR, and/or the MSR of the registers REG.

In operation S36, the MCA (e.g., the CMCI handler or the second RAS handler) of the operating system 230 may read information about the corrected error loaded to the main memory MEM by the BIOS 220.

As described with reference to FIG. 4, the MCA handler (or the RAS handler) of the operating system 230 may determine the risk level of the corrected error based on the error log and the corrected error count and the information read from the main memory MEM.

When the risk level of the corrected error is low, the MCA (or the CMCI handler or the second RAS handler) of the operating system 230 may terminate the processing of the corrected error, which is caused by the CMCI or the SCI. When the risk level of the corrected error is high, in operation S37, the MCA (e.g., the CMCI handler or the second RAS handler) of the operating system 230 may record the address of the corrected error at the PPR list PL (e.g., a "pprAddrSetup" field) of the BIOS 220.

As the address of the corrected error is recorded at the PPR list PL, the PPR for the address of the corrected error may be scheduled. The SMI handler (or the RAS handler) of the BIOS 220 may terminate the processing of the corrected error, which is caused by the CMCI or the SMI.

In some example embodiments, instead of the operating system 230, the SMI handler (or the first RAS handler) of the BIOS 220 may determine the risk level of the corrected error based on the error log and the corrected error count read from the MCB, the CSR, and/or the MSR of the registers REG. The SMI handler (or the first RAS handler) of the BIOS 220 may store the risk level of the corrected error in the main memory MEM. The MCA (e.g., the CMCI handler or the second RAS handler) of the operating system 230 may read the risk level of the corrected error from the main memory MEM instead of determining the risk level of the corrected error.

Alternatively, when the risk level of the corrected error is determined to be high, the SMI handler (or the first RAS handler) of the BIOS 220 may record the address of the corrected error at the PPR list PL. The SMI handler (or the first RAS handler) of the BIOS 220 may provide notification that the address of the corrected error is recorded at the PPR list PL, by transmitting the CMCI or the SCI to the operating system 230.

In some example embodiments, operation S33 and the operation S36 marked by a dotted line may be selectively performed.

Figure 9:
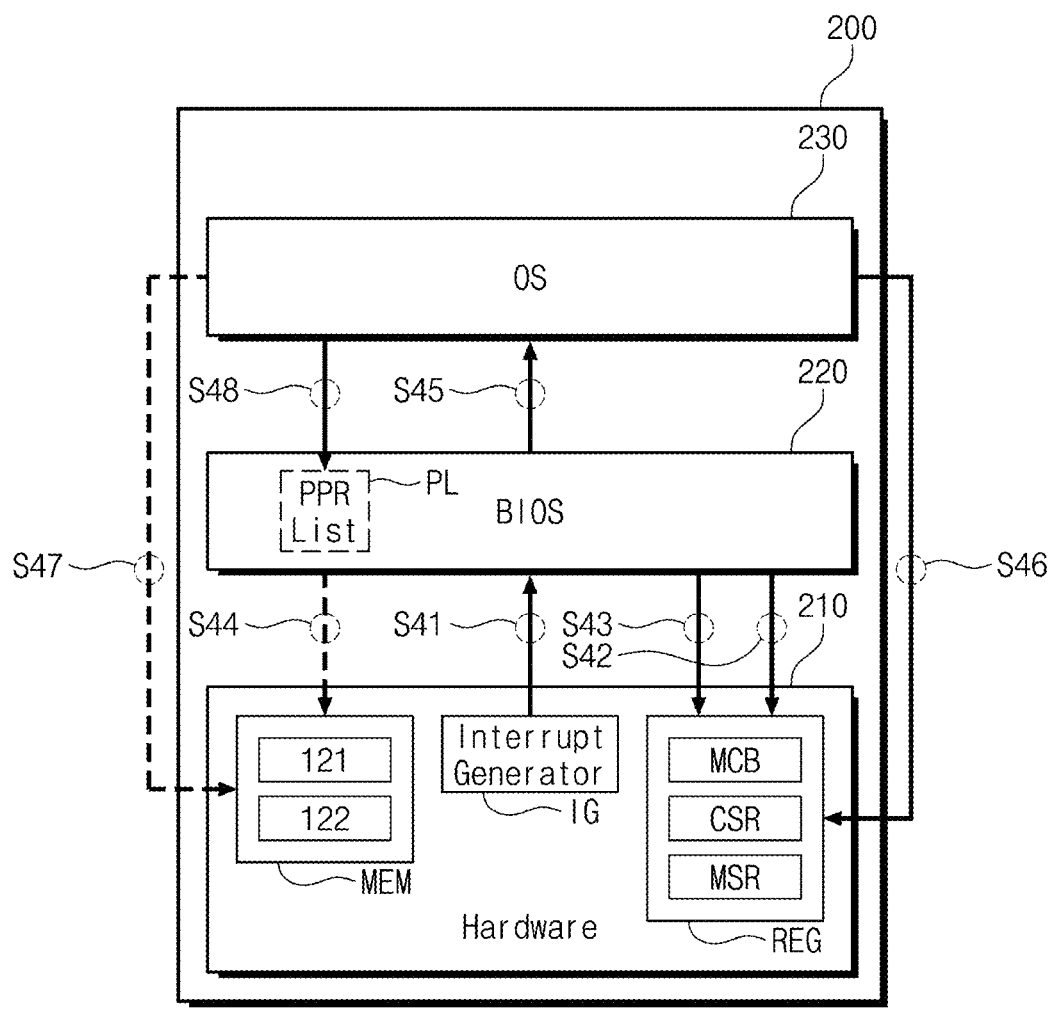
FIG. 9 is a diagram illustrating a fourth example of a process where an operating method of FIG. 3 is performed in an electronic device of FIG. 2.

FIG. 9 is a diagram illustrating a fourth example of a process where the operating method of FIG. 3 is performed in the electronic device 200 of FIG. 2. In some example embodiments, an example where the electronic device 200 is implemented based on the EMCA is illustrated in FIG. 9.

Referring to FIG. 9, in operation S41, the interrupt generator IG may transfer the interrupt to the BIOS 220. For example, when the corrected error CE occurs in the first memory module 121 and/or the second memory module 122 of the main memory MEM, the interrupt generator IG may transmit the interrupt to the BIOS 220 through the SMI.

As the SMI is received, the SMI handler of the BIOS 220 may be activated. In operation S42, the SMI handler (or a first RAS handler) of the BIOS 220 may read the error log and/or the corrected error count from at least one of the MCB, the CSR, and/or the MSR of the registers REG.

The access of the operating system 230 to at least some of the MCB, the CSR, and/or the MSR of the registers REG may be limited. In operation S43, the SMI handler (or the first RAS handler) of the BIOS 220 may store information (e.g., information about the corrected error) of registers prohibited from being accessed by the operating system 230, in registers permitted to be accessed by the operating system 230. Alternatively, in operation S44, the SMI handler (or the first RAS handler) of the BIOS 220 may store information (e.g., information about the corrected error) of the registers, which are prohibited from being accessed by the operating system 230, in the main memory MEM.

In operation S45, the SMI handler (or the first RAS handler) of the BIOS 220 may transmit the CMCI and/or the SCI (System Control Interrupt) to the operating system 230. In response to the CMCI and/or the SCI, in operation S46, the MCA (e.g., the CMCI handler or a second RAS handler) of the operating system 230 may read the error log and the corrected error count from at least one of the MCB, the CSR, and/or the MSR of the registers REG.

In operation S47, the MCA (e.g., the CMCI handler or the second RAS handler) of the operating system 230 may read information about the corrected error loaded to the main memory MEM by the BIOS 220.

As described with reference to FIG. 4, the MCA handler (or the RAS handler) of the operating system 230 may determine the risk level of the corrected error based on the error log and the corrected error count and the information read from the main memory MEM.

When the risk level of the corrected error is low, the MCA (or the CMCI handler or the second RAS handler) of the operating system 230 may terminate the processing of the corrected error, which is caused by the CMCI or the SCI. When the risk level of the corrected error is high, in operation S48, the MCA (e.g., the CMCI handler or the second RAS handler) of the operating system 230 may record the address of the corrected error at the PPR list PL (e.g., a "pprAddrSetup" field) of the BIOS 220.

As the address of the corrected error is recorded at the PPR list PL, the PPR for the address of the corrected error may be scheduled. The SMI handler (or the RAS handler) of the BIOS 220 may terminate the processing of the corrected error, which is caused by the CMCI and/or the SCI.

In some example embodiments, instead of the operating system 230, the SMI handler (or the first RAS handler) of the BIOS 220 may determine the risk level of the corrected error based on the error log and the corrected error count read from the MCB, the CSR, and/or the MSR of the registers REG. The SMI handler (or the first RAS handler) of the BIOS 220 may store the risk level of the corrected error in the registers REG and/or the main memory MEM. The MCA (e.g., the CMCI handler or the second RAS handler) of the operating system 230 may read the risk level of the corrected error from the registers REG and/or the main memory MEM instead of determining the risk level of the corrected error.

Alternatively, when the risk level of the corrected error is determined to be high, the SMI handler (or the first RAS handler) of the BIOS 220 may record the address of the corrected error at the PPR list PL. The SMI handler (or the first RAS handler) of the BIOS 220 may provide notification that the address of the corrected error is recorded at the PPR list PL, by transmitting the CMCI and/or the SCI to the operating system 230.

In some example embodiments, operation S44 and the operation S47 marked by a dotted line may be selectively performed.

Figure 10:
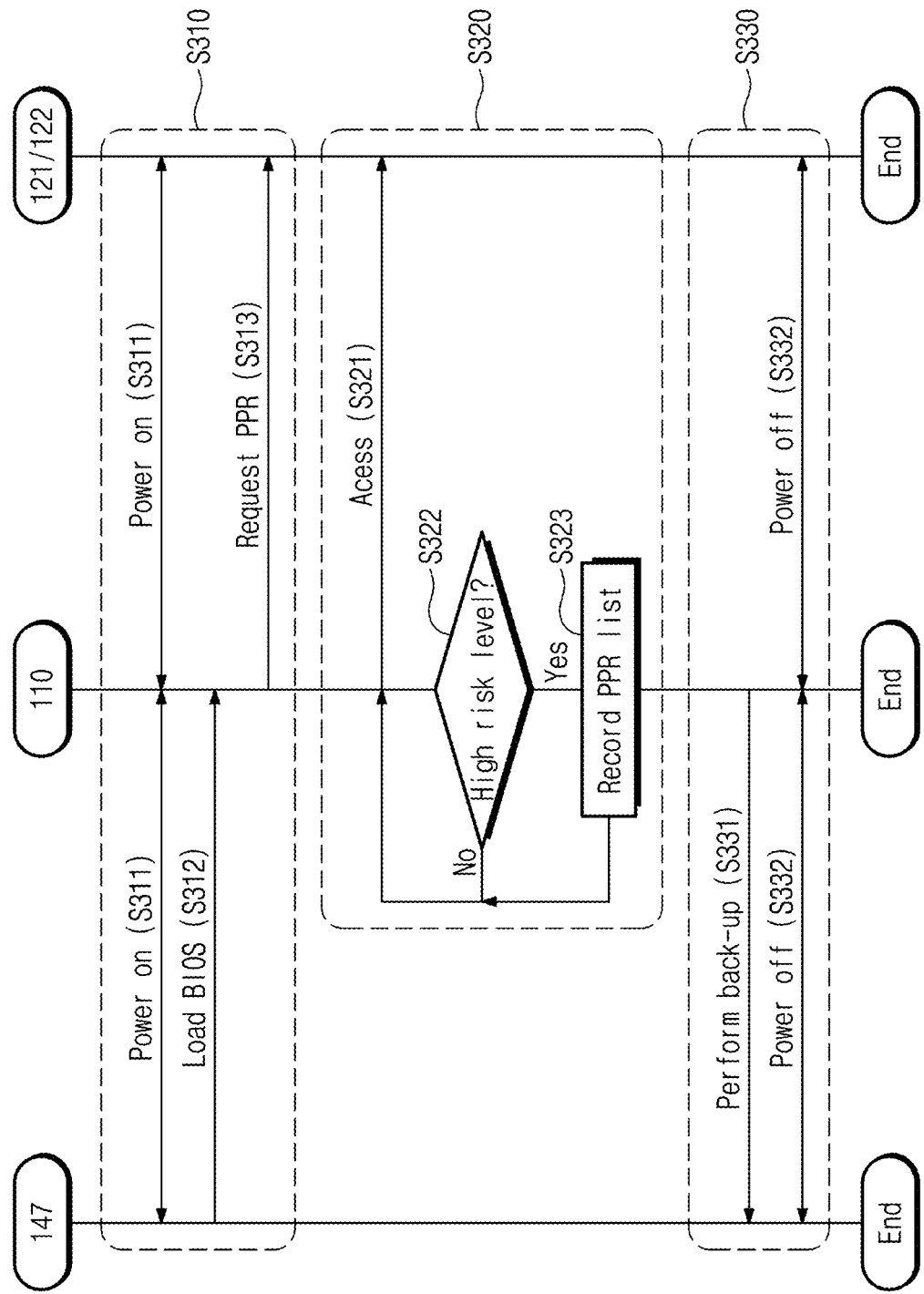
FIG. 10 is a diagram illustrating a first example of a process where an electronic device performs PPR.

FIG. 10 is a diagram illustrating a first example of a process where the electronic device 100 performs the PPR. Referring to FIGS. 1, 2, and 10, in operation S311, the processor 110, the main memory MEM including the first memory module 121 and/or the second memory module 122, and/or the BIOS device 147 may be powered on.

After the internal initialization of the processor 110 is completed, in operation S312, the processor 110 may load the BIOS from the BIOS device 147. The processor 110 may execute the BIOS to initialize the components of the electronic device 100. Also, the processor 110 may read an address (or addresses) stored in the PPR list PL included in the memory reference code MRC of the BIOS.

In operation S313, the processor 110 may request the PPR from the first memory module 121 and/or the second memory module 122, based on the address (or addresses) stored in the PPR list PL. The PPR request may include the address (or addresses) of the PPR list PL. The first memory module 121 and/or the second memory module 122 may perform the PPR in response to the PPR request and the address (or addresses).

For example, the PPR may include software PPR and/or hardware PPR. The software PPR may include replacing the address (or addresses) with a redundant address (or redundant addresses) only until the power is turned off (e.g., only while the power is maintained). The hardware PPR may include permanently replacing the address (or addresses) with a redundant address (or redundant addresses) by using a marking element such as an electric fuse. The software PPR may be temporary, and the hardware PPR may be permanent.

Whether the first memory module 121 and/or the second memory module 122 performs the software PPR and/or the hardware PPR may be determined when the processor 110 initializes the first memory module 121 and/or the second memory module 122. Alternatively, whether the first memory module 121 and/or the second memory module 122 performs the software PPR or the hardware PPR may be determined in the process of manufacturing the first memory module 121 and/or the second memory module 122 and/or in the process of manufacturing the electronic device 100.

Operation S311, operation S312, and/or operation S313 may form a power-on sequence S310 of the electronic device 100.

In operation S321, the processor 110 may access the first memory module 121 and/or the second memory module 122. In some example embodiments, the corrected error may occur in the process where the processor 110 accesses the first memory module 121 and/or the second memory module 122. When the corrected error occurs, in operation S322, the processor 110 may determine whether the corrected error has a high risk level. For example, the processor 110 may determine whether the risk level of the corrected error is high. When the risk level of the corrected error is low, the processor 110 may not perform the PPR associated with the corrected error and may access the first memory module 121 and/or the second memory module 122 in operation S321. When the risk level of the corrected error is high, the processor 110 may record the corrected error at the PPR list PL. Afterwards, the processor 110 may access the first memory module 121 and/or the second memory module 122.

In some example embodiments, operation S321, operation S322, and/or operation S323 may form a normal operation sequence S320 of the electronic device 100. When no corrected error occurs in the process where the processor 110 accesses the first memory module 121 and/or the second memory module 122, operation S322 and operation S323 may be omitted without execution. When an uncorrected error occurs in the process where the processor 110 accesses the first memory module 121 and/or the second memory module 122, the processor 110 may perform operations according to a separate policy for processing the uncorrected error.

In operation S331, the processor 110 may back data requiring the back-up from among the data of the BIOS up to the BIOS device 147. For example, the processor 110 may back the PPR list PL up to the BIOS device 147. In operation S332, the processor 110, the main memory MEM including the first memory module 121 and the second memory module 122, and the BIOS device 147 may be powered off. Operation S311 and/or operation S332 may form a power-off sequence S330 of the electronic device 100.

As described above, the electronic device 100 may record the address of the corrected error (or the addresses of the corrected errors) each, or one or more, having the high risk level in the PPR list PL and may request the PPR from the first memory module 121 and/or the second memory module 122 based on the PPR list PL in a next power-on sequence.

Figure 11:
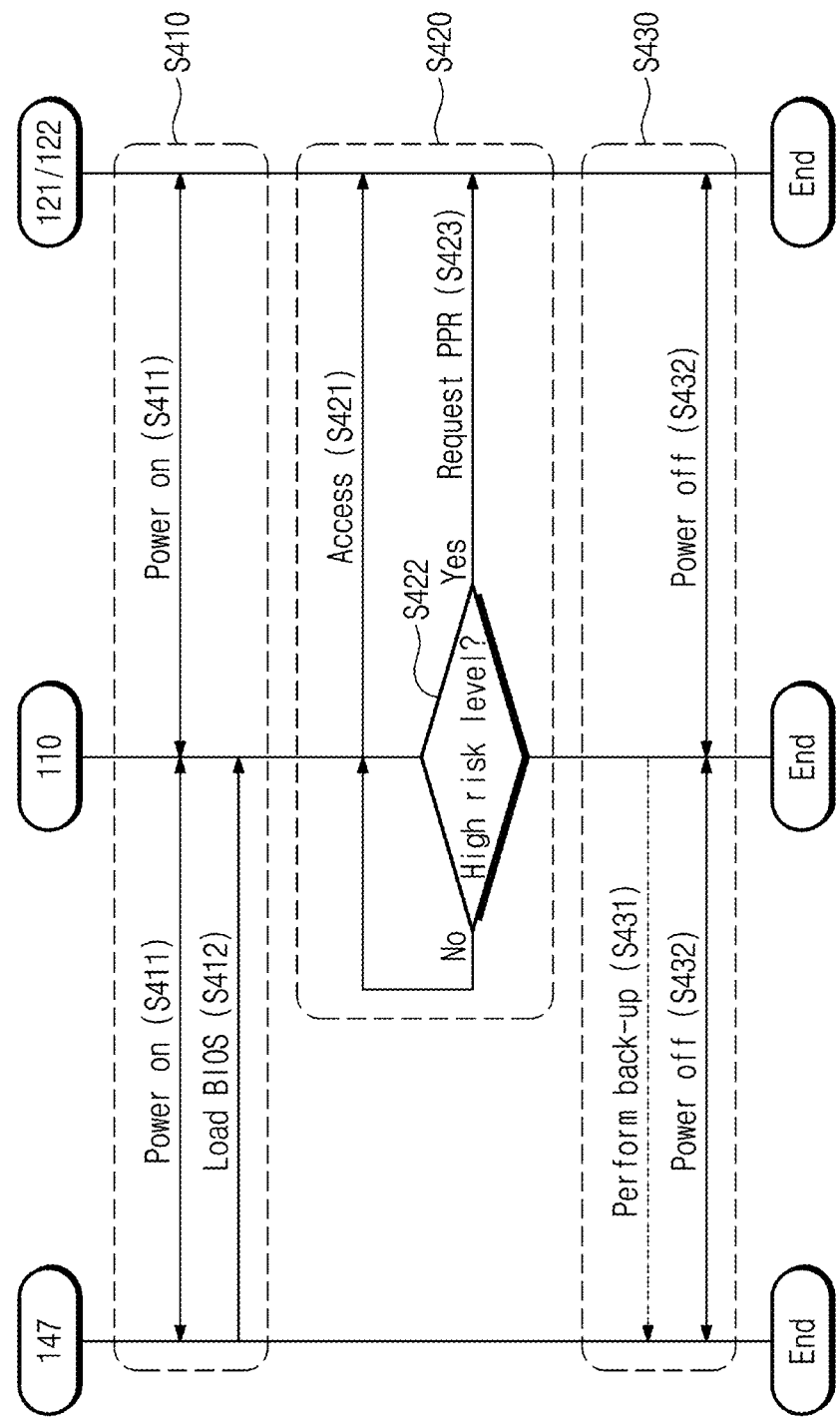
FIG. 11 is a diagram illustrating a second example of a process where an electronic device performs PPR.

FIG. 11 is a diagram illustrating a second example of a process where the electronic device 100 performs the PPR. Referring to FIGS. 1, 2, and 11, in operation S411, the processor 110, the main memory MEM including the first memory module 121 and/or the second memory module 122, and the BIOS device 147 may be powered on.

After the internal initialization of the processor 110 is completed, in operation S412, the processor 110 may load the BIOS from the BIOS device 147. The processor 110 may execute the BIOS to initialize the components of the electronic device 100.

Operation S411 and/or operation S412 may form a power-on sequence S410 of the electronic device 100.

In operation S421, the processor 110 may access the first memory module 121 and/or the second memory module 122. In some example embodiments, the corrected error may occur in the process where the processor 110 accesses the first memory module 121 and/or the second memory module 122. When the corrected error occurs, in operation S422, the processor 110 may determine whether the corrected error has a high risk level. For example, the processor 110 may determine whether the risk level of the corrected error is high. When the risk level of the corrected error is low, the processor 110 may not perform the PPR associated with the corrected error and may access the first memory module 121 and/or the second memory module 122 in operation S421. When the risk level of the corrected error is high, in operation S423, the processor 110 may request the PPR from the first memory module 121 and/or the second memory module 122 based on the address of the corrected error.

In some example embodiments, operation S421, operation S422 and/or operation S423 may form a normal operation sequence S420 of the electronic device 100. When no corrected error occurs in the process where the processor 110 accesses the first memory module 121 and/or the second memory module 122, operation S422 may be omitted without execution. When an uncorrected error occurs in the process where the processor 110 accesses the first memory module 121 and/or the second memory module 122, the processor 110 may perform operations according to a separate policy for processing the uncorrected error.

In operation S431, the processor 110 may back data requiring the back-up from among the data of the BIOS up to the BIOS device 147. In operation S432, the processor 110, the main memory MEM including the first memory module 121 and/or the second memory module 122, and/or the BIOS device 147 may be powered off. Operation S431 and/or operation S432 may form a power-off sequence S430 of the electronic device 100.

As described above, the electronic device 100 may request the PPR from the first memory module 121 and/or the second memory module 122 immediately based on the address of the corrected error having the high risk level.

Figure 12:
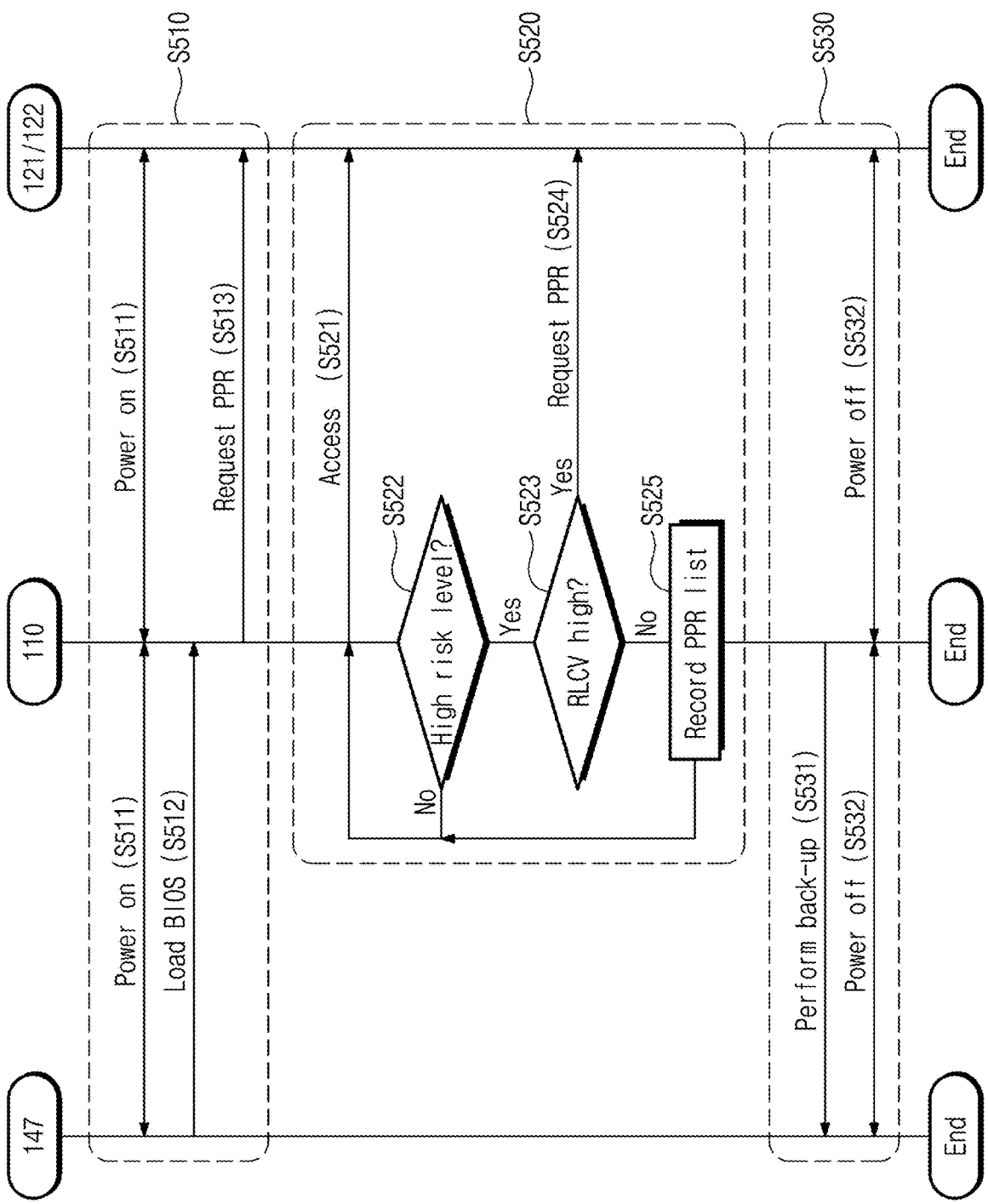
FIG. 12 is a diagram illustrating a third example of a process where an electronic device performs PPR.

FIG. 12 is a diagram illustrating a third example of a process where the electronic device 100 performs the PPR. Referring to FIGS. 1, 2, and 12, in operation S511, the processor 110, the main memory MEM including the first memory module 121 and/or the second memory module 122, and/or the BIOS device 147 may be powered on.

After the internal initialization of the processor 110 is completed, in operation S512, the processor 110 may load the BIOS from the BIOS device 147. The processor 110 may execute the BIOS to initialize the components of the electronic device 100. Also, the processor 110 may read an address (or addresses) stored in the PPR list PL included in the memory reference code MRC.

In operation S513, the processor 110 may request the PPR from the first memory module 121 and/or the second memory module 122, based on the address (or addresses) stored in the PPR list PL. The PPR request may include the address (or addresses) of the PPR list PL. The first memory module 121 and/or the second memory module 122 may perform the PPR in response to the PPR request and the address (or addresses).

Operation S511, operation S512, and/or operation S513 may form a power-on sequence S510 of the electronic device 100.

In operation S521, the processor 110 may access the first memory module 121 and/or the second memory module 122. In some example embodiments, the corrected error may occur in the process where the processor 110 accesses the first memory module 121 and/or the second memory module 122. When the corrected error occurs, in operation S522, the processor 110 may determine whether the corrected error has a high risk level. For example, the processor 110 may determine whether the risk level of the corrected error is high. When the risk level of the corrected error is low, the processor 110 may not perform the PPR associated with the corrected error and may access the first memory module 121 and/or the second memory module 122 in operation S521. When the risk level of the corrected error is high, in operation S523, the processor 110 may determine a risk level comparison value RLCV of the corrected error. When the risk level comparison value RLCV of the corrected error indicates a higher risk, in operation S524, the processor 110 may request the PPR from the first memory module 121 and/or the second memory module 122 based on the address of the corrected error.

When the risk level comparison value RLCV of the corrected error indicates a less risk, in operation S525, the processor 110 may record the address of the corrected error at the PPR list PL. Afterwards, the processor 110 may access the first memory module 121 and/or the second memory module 122.

In some example embodiments operation S521, operation S522, operation S523, operation S524, and/or operation S525 may form a normal operation sequence S520 of the electronic device 100. When no corrected error occurs in the process where the processor 110 accesses the first memory module 121 and/or the second memory module 122, operation S522 may be omitted without execution. When an uncorrected error occurs in the process where the processor 110 accesses the first memory module 121 and/or the second memory module 122, the processor 110 may perform operations according to a separate policy for processing the uncorrected error.

In operation S531, the processor 110 may back data requiring the back-up from among the data of the BIOS up to the BIOS device 147. For example, the processor 110 may back the PPR list PL up to the BIOS device 147. In operation S532, the processor 110, the main memory MEM including the first memory module 121 and/or the second memory module 122, and/or the BIOS device 147 may be powered off. Operation S531 and/or operation S532 may form a power-off sequence S530 of the electronic device 100.

As described above, the electronic device 100 may selectively perform one of the immediate PPR or the delayed PPR depending on a feature of the corrected error having a high risk level. In the delayed PPR, the processor 110 may request the PPR from the first memory module 121 and/or the second memory module 122 based on the PPR list PL in a next power-on sequence.

Figure 13:
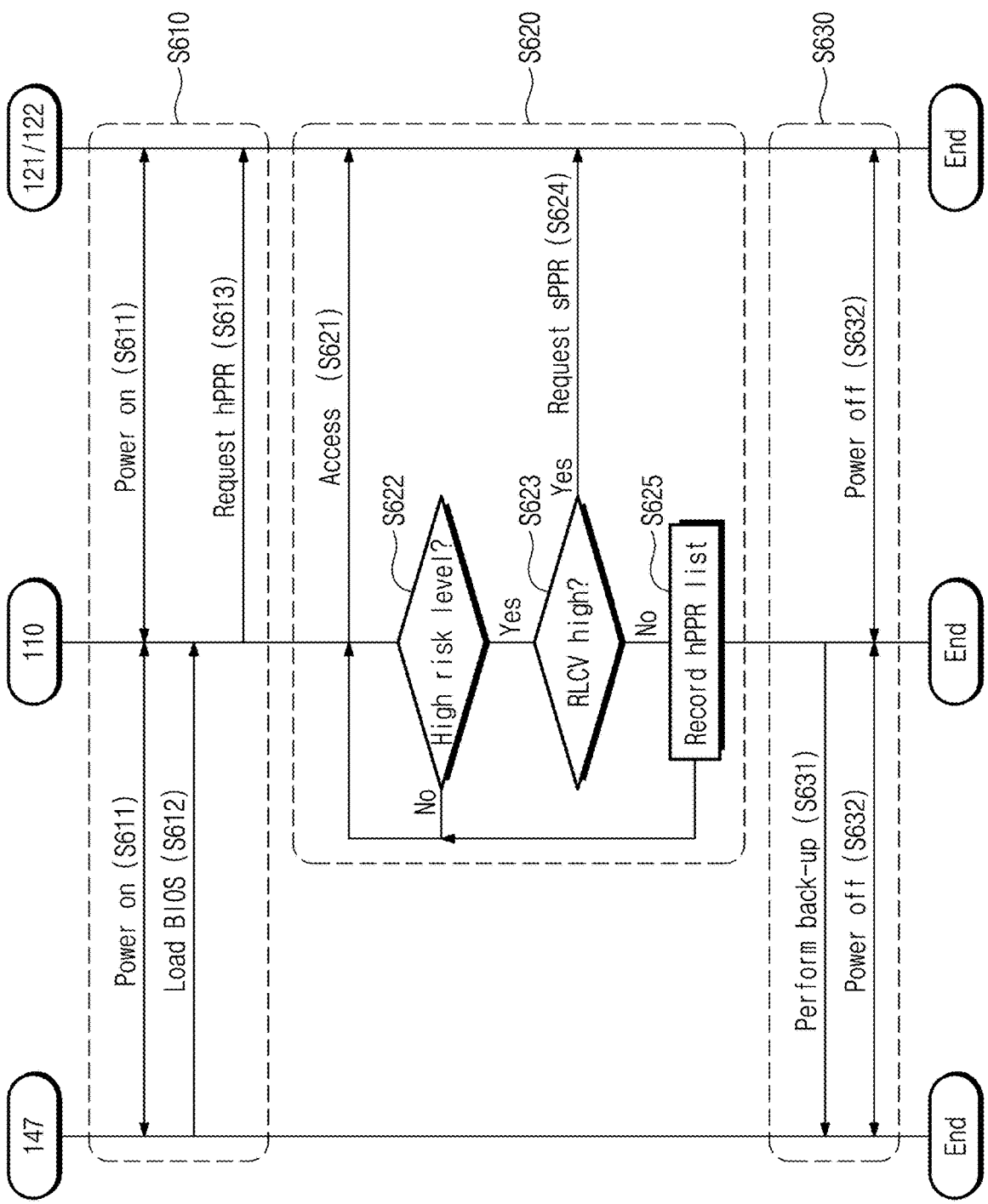
FIG. 13 is a diagram illustrating a fourth example of a process where an electronic device performs PPR.

FIG. 13 is a diagram illustrating a fourth example of a process where the electronic device 100 performs the PPR. Referring to FIGS. 1, 2, and 13, in operation S611, the processor 110, the main memory MEM including the first memory module 121 and/or the second memory module 122, and/or the BIOS device 147 may be powered on.

After the internal initialization of the processor 110 is completed, in operation S612, the processor 110 may load the BIOS from the BIOS device 147. The processor 110 may execute the BIOS to initialize the components of the electronic device 100. Also, the processor 110 may read an address (or addresses) stored in the PPR list PL included in the memory reference code MRC.

In operation S613, the processor 110 may request the hPPR (e.g., the hardware PPR) from the first memory module 121 and/or the second memory module 122, based on the address (or addresses) stored in the PPR list PL. The hPPR request may include the address (or addresses) of the PPR list PL. The first memory module 121 and/or the second memory module 122 may perform the hPPR in response to the hPPR request and the address (or addresses).

Operation S611, operation S612, and/or operation S613 may form a power-on sequence S610 of the electronic device 100.

In operation S621, the processor 110 may access the first memory module 121 and/or the second memory module 122. In some example embodiments, the corrected error may occur in the process where the processor 110 accesses the first memory module 121 and/or the second memory module 122. When the corrected error occurs, in operation S622, the processor 110 may determine whether the corrected error has a high risk level. For example, the processor 110 may determine whether the risk level of the corrected error is high. When the risk level of the corrected error is low, the processor 110 may not perform the PPR associated with the corrected error and may access the first memory module 121 or the second memory module 122 in operation S621. When the risk level of the corrected error is high, in operation S623, the processor 110 may determine a risk level comparison value RLCV of the corrected error. When the risk level comparison value RLCV of the corrected error indicates a higher risk, in operation S624, the processor 110 may request the sPPR (e.g., the software PPR) from the first memory module 121 and/or the second memory module 122 based on the address of the corrected error.

When the risk level comparison value RLCV of the corrected error indicates a less risk, in operation S625, the processor 110 may record the address of the corrected error at the hPPR list. Afterwards, the processor 110 may access the first memory module 121 or the second memory module 122.

In an embodiment operation S621, operation S622, operation S623, operation S624, and/or operation S625 may form a normal operation sequence S620 of the electronic device 100. When no corrected error occurs in the process where the processor 110 accesses the first memory module 121 and/or the second memory module 122, operation S622 may be omitted without execution. When an uncorrected error occurs in the process where the processor 110 accesses the first memory module 121 and/or the second memory module 122, the processor 110 may perform operations according to a separate policy for processing the uncorrected error.

In operation S631, the processor 110 may back data requiring the back-up from among the data of the BIOS up to the BIOS device 147. For example, the processor 110 may back the hPPR list up to the BIOS device 147. In operation S632, the processor 110, the main memory MEM including the first memory module 121 and/or the second memory module 122, and/or the BIOS device 147 may be powered off. Operation S631 and/or operation S632 may form a power-off sequence S630 of the electronic device 100.

As described above, the electronic device 100 may selectively perform one of the immediate sPPR or the delayed hPPR depending on a feature of the corrected error having a high risk level. In the delayed hPPR, the processor 110 may request the hPPR from the first memory module 121 and/or the second memory module 122 based on the hPPR list in a next power-on sequence.

Figure 14:
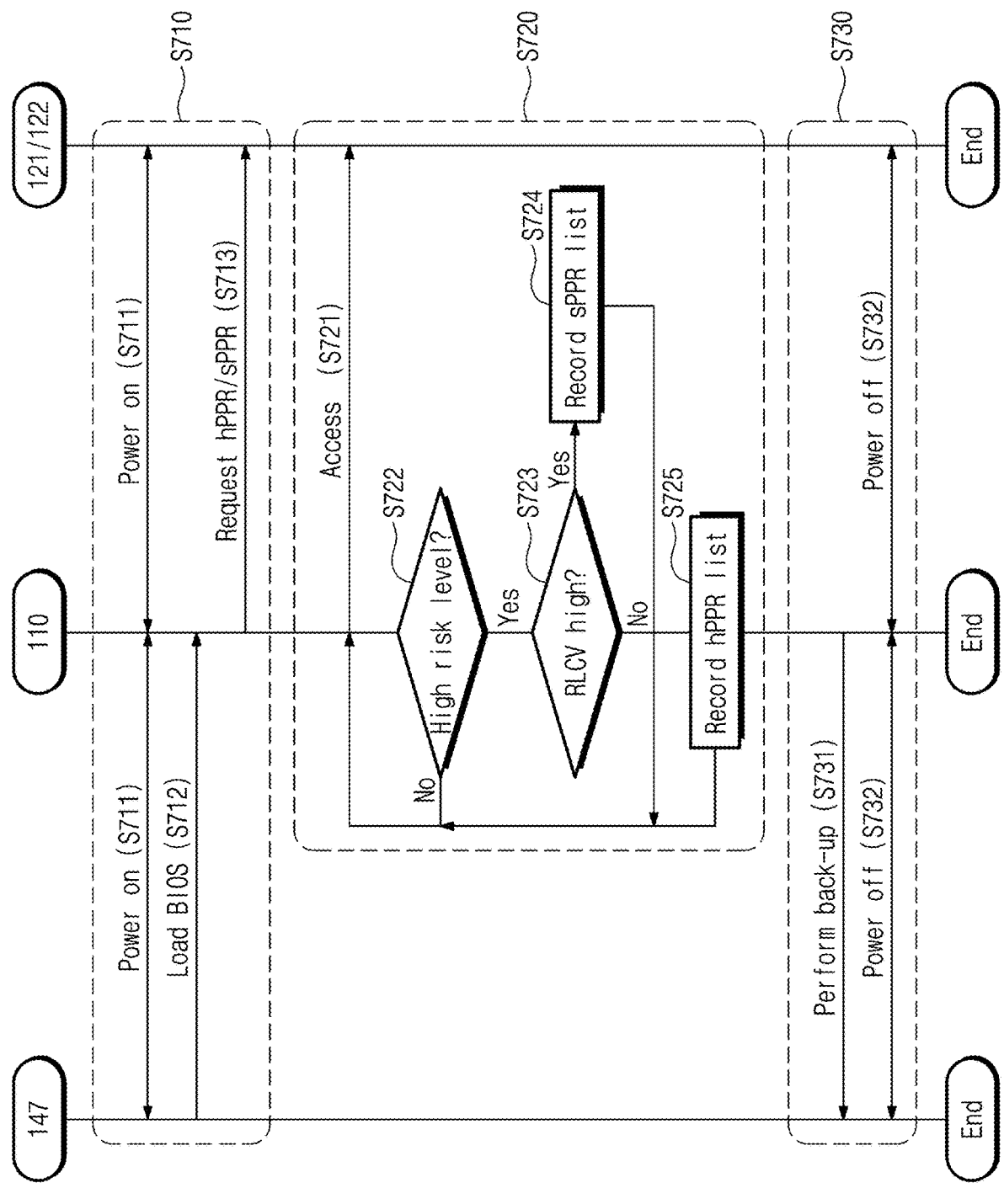
FIG. 14 is a diagram illustrating a fifth example of a process where an electronic device performs PPR.

FIG. 14 is a diagram illustrating a fifth example of a process where the electronic device 100 performs the PPR. Referring to FIGS. 1, 2, and 14, in operation S711, the processor 110, the main memory MEM including the first memory module 121 and/or the second memory module 122, and/or the BIOS device 147 may be powered on.

After the internal initialization of the processor 110 is completed, in operation S712, the processor 110 may load the BIOS from the BIOS device 147. The processor 110 may execute the BIOS to initialize the components of the electronic device 100. Also, the processor 110 may read an address (or addresses) stored in the PPR list PL (e.g., the sPPR list or the hPPR list) included in the memory reference code MRC of the BIOS.

In operation S713, the processor 110 may request the hPPR (e.g., the hardware PPR) and the sPPR (e.g., the software PPR) from the first memory module 121 and/or the second memory module 122, based on the address (or addresses) stored in the PPR list PL (e.g., the sPPR list or the hPPR list). The hPPR request may include the address (or addresses) of the hPPR list. The sPPR request may include the address (or addresses) of the sPPR list. The first memory module 121 and/or the second memory module 122 may perform the hPPR and/or the sPPR in response to the hPPR request, the sPPR request, and/or the address (or addresses).

Operation S711, operation S712, and/or operation S713 may form a power-on sequence S710 of the electronic device 100.

In operation S721, the processor 110 may access the first memory module 121 and/or the second memory module 122. In some example embodiments, the corrected error may occur in the process where the processor 110 accesses the first memory module 121 and/or the second memory module 122. When the corrected error occurs, in operation S722, the processor 110 may determine whether the corrected error has a high risk level. For example, the processor 110 may determine whether the risk level of the corrected error is high. When the risk level of the corrected error is low, the processor 110 may not perform the PPR associated with the corrected error and may access the first memory module 121 and/or the second memory module 122 in operation S721. When the risk level of the corrected error is high, in operation S723, the processor 110 may determine a risk level comparison value RLCV of the corrected error. When the risk level comparison value RLCV of the corrected error indicates a higher risk, in operation S724, the processor 110 may record the address of the corrected error at the sPPR list. Afterwards, the processor 110 may access the first memory module 121 and/or the second memory module 122.

When the risk level comparison value RLCV of the corrected error indicates a less risk, in operation S725, the processor 110 may record the address of the corrected error at the hPPR list. Afterwards, the processor 110 may access the first memory module 121 and/or the second memory module 122.

In some example embodiments operation S721, operation S722, operation S723, operation S724, and/or operation S725 may form a normal operation sequence S720 of the electronic device 100. When no corrected error occurs in the process where the processor 110 accesses the first memory module 121 and/or the second memory module 122, operation S722 may be omitted without execution. When an uncorrected error occurs in the process where the processor 110 accesses the first memory module 121 and/or the second memory module 122, the processor 110 may perform operations according to a separate policy for processing the uncorrected error.

In operation S731, the processor 110 may back data requiring the back-up from among the data of the BIOS up to the BIOS device 147. For example, the processor 110 may back the hPPR list and the sPPR list up to the BIOS device 147. In operation S732, the processor 110, the main memory MEM including the first memory module 121 and/or the second memory module 122, and/or the BIOS device 147 may be powered off. Operation S731 and/or operation S732 may form a power-off sequence S730 of the electronic device 100.

As described above, the electronic device 100 may selectively perform one of the delayed sPPR or the delayed hPPR depending on a feature of the corrected error having a high risk level. In the delayed hPPR, the processor 110 may request the hPPR from the first memory module 121 and/or the second memory module 122 based on the hPPR list in a next power-on sequence. In the delayed sPPR, the processor 110 may request the sPPR from the first memory module 121 and/or the second memory module 122 based on the sPPR list in a next power-on sequence.

Figure 15:
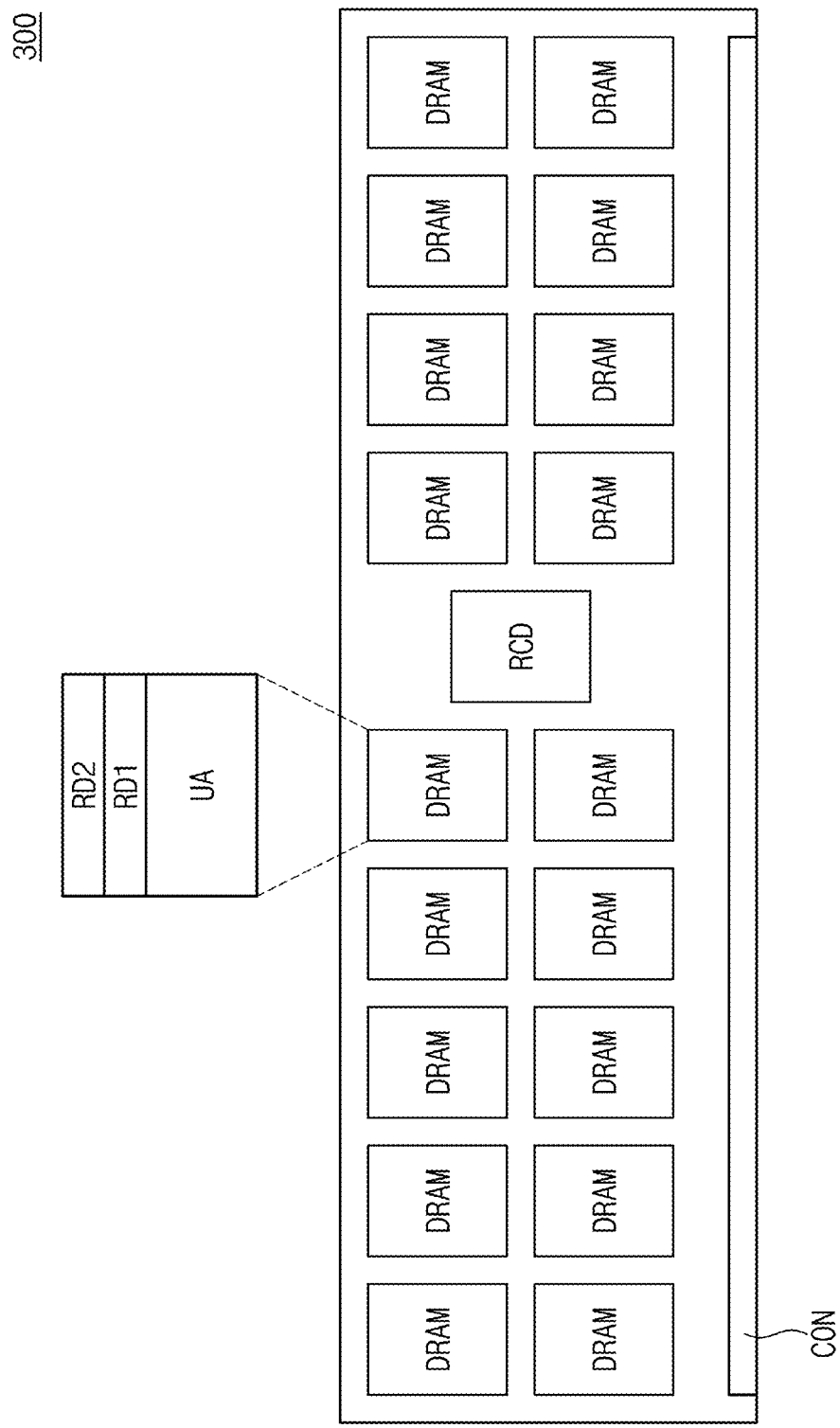
FIG. 15 is a diagram illustrating an example of a memory module.

FIG. 15 is a diagram illustrating an example of a memory module 300. The memory module 300 may correspond to the first memory module 121 and/or the second memory module 122 of FIG. 1. Referring to FIGS. 1 and 15, the memory module 300 may include dynamic random access memories DRAM, a register clock driver RCD, and/or a connector CON. The register clock driver RCD may receive a command and an address from the processor 110 through the connector CON and may transfer the command and the address to the dynamic random access memories DRAM. The dynamic random access memories DRAM may exchange data signals with the processor 110 through the connector CON.

Each, or one or more, of the dynamic random access memories DRAM may include a user area UA, a first redundant area RD1, and/or a second redundant area RD2. The user area UA may be a storage space that is accessed by the processor 110. The first redundant area RD1 and/or the second redundant area RD2 may be used to replace the storage space of the user area UA in the PPR.

In some example embodiments, the first redundant area RD1 may be used in the software PPR. The second redundant area RD2 may be used in the hardware PPR. That is, the first redundant area RD1 for the software PPR and the second redundant area RD2 for the hardware PPR may be physically separated from each other. However, example embodiments of the inventive concepts are not limited to a redundant area for the software PPR and a redundant area for the hardware PPR are physically separated from each other in each of the dynamic random access memories DRAM.

In some example embodiments, the memory module 300 is described with reference to the RDIMM (Registered DIMM) as an example. However, the memory module 300 is not limited to the RDIMM. For example, the memory module 300 may be variously implemented with an UDIMM (Unbuffered DIMM), an LRDIMM (Load Reduced DIMM), and/or an SODIMM (Small Outline DIMM)

In the above example embodiments, components according to the inventive concepts are described by using the terms "first", "second", "third", etc. However, the terms "first", "second", "third", etc. may be used to distinguish components from each other and do not limit the inventive concepts. For example, the terms "first", "second", "third", etc. do not involve an order or a numerical meaning of any form.

In the above example embodiments, components according to some example embodiments of the inventive concepts are referenced by using blocks. The blocks may be implemented with various hardware devices, such as an integrated circuit, an application specific IC (ASIC), a field programmable gate array (FPGA), and/or a complex programmable logic device (CPLD), firmware driven in hardware devices, software such as an application, and/or a combination of a hardware device and software. Also, the blocks may include circuits implemented with semiconductor elements in an integrated circuit, or circuits enrolled as an intellectual property (IP).

According to the inventive concepts, a processor performs PPR (Post Package Repair) based on whether the corrected error CE occurs in any read of a read retry operation, as well as a corrected error count. Accordingly, an uncorrected error is reduced, or prevented, from occurring when the processor reads data from a memory module.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. An electronic device comprising:
   a memory module including at least one dynamic random access memory; and
   a processor configured to:
      access the memory module,
      determine a corrected error count associated with an address of a corrected error, in response to the corrected error being detected when data are read from the memory module;
      read an error log associated with the corrected error;
      determine a risk level of the corrected error based on the error log;
      determine whether the corrected error is a temporary error based on a number of occurrences of a read error in a read retry operation;
      determine the risk level of the corrected error to be low in response to determining that the corrected error is a temporary error;
      determine the risk level of the corrected error to be high in response to determining that the corrected error is not a temporary error; and
      schedule a post package repair (PPR) for the address of the corrected error in response to the risk level being high.

2. The electronic device of claim 1, wherein the processor is configured to:
   determine the risk level of the corrected error to be high, in response to the corrected error count associated with the address of the corrected error exceeding a threshold value.

3. The electronic device of claim 1, wherein the processor is configured to:
   request a read operation from the memory module based on the address;
   request the read retry operation from the memory module in response to the read operation failing; and
   detect the corrected error in response to the read retry operation succeeding.

4. The electronic device of claim 3, wherein the processor is configured to perform the read operation by:
   requesting the memory module to perform a read phase of the read operation; and
   requesting the memory module to perform a retransmission phase of the read operation in response to an error occurring in the read phase.

5. The electronic device of claim 3, wherein the processor is configured to perform the read retry operation by:
   requesting the memory module to perform a first read phase to a fourth read phase until the read retry operation succeeds.

6. The electronic device of claim 5, wherein the processor is configured to:
   determine the risk level of the corrected error to be low in response to the first read phase of the read retry operation succeeding; and
   determine the risk level of the corrected error to be high in response to the first read phase of the read retry operation not succeeding.

7. The electronic device of claim 3, wherein the processor is configured to perform the read retry operation by:
   requesting the memory module to perform a read phase; and
   requesting the memory module to again perform the read phase N times in response to an error occurring in the read phase, N being a positive integer.

8. The electronic device of claim 5, wherein the processor is configured to:
   determine the risk level of the corrected error to be low in response to an M-th read phase of the read retry operation succeeding or a previous read phase of the M-th read phase succeeding, wherein M is a positive integer smaller than N; and
   determine the risk level of the corrected error to be high in response to the M-th read phase of the read retry operation failing and the previous read phase of the M-th read phase failing.

9. The electronic device of claim 1, wherein the processor is configured to:
   collect a list of at least one address of at least one corrected error having a high risk level; and
   request the PPR from the memory module based on the list of the at least one address in a next power-on sequence.

10. The electronic device of claim 1, wherein the processor is configured to:
    request the PPR from the memory module based on the address of the corrected error in response to that the risk level of the corrected error being determined to be high.

11. The electronic device of claim 10, wherein the processor is configured to:
    request, based on the address of the corrected error, the PPR from the memory module within an idle time of the memory module or before accessing the memory module.

12. The electronic device of claim 1, wherein the processor is configured to:
    determine a risk level comparison value of the corrected error in response to the risk level of the corrected error being determined to be high.

13. The electronic device of claim 12, wherein, the processor is configured to:
    request the PPR of the corrected error from the memory module in response to the risk level comparison value indicating a higher risk; and
    request the PPR of the corrected error from the memory module after a next power-on in response to the risk level comparison value indicating a lower risk.

14. The electronic device of claim 12, wherein the PPR includes a software PPR (sPPR) and a hardware PPR (hPPR), and the processor is configured to:
    schedule the hardware PPR as the PPR of the corrected error in response to the risk level comparison value indicating a higher risk; and
    request the software PPR as the PPR of the corrected error from the memory module in response to the risk level comparison value indicating a lower risk.

15. The electronic device of claim 14, wherein the processor is configured to immediately request the software PPR from the memory module and requests the hardware PPR from the memory module after a next power-on.

16. An operating method of an electronic device including a processor and a memory module, the method comprising:
    performing, at the processor, a read operation on the memory module;

performing, at the processor, a read retry operation on the memory module in response to an error occurring in the read operation;

determining, at the processor, a risk level of a corrected error, based on whether the corrected error occurs in any read phase of the read retry operation;

determining whether the corrected error is a temporary error based on a number of occurrences of a read error in the read retry operation;

determining the risk level of the corrected error to be low in response to determining that the corrected error is a temporary error;

determining the risk level of the corrected error to be high in response to determining that the corrected error is not a temporary error; and scheduling, at the processor, a post package repair (PPR) of the memory module based on an address of the corrected error, in response to the risk level of the corrected error being high.

17. The method of claim 16, wherein the scheduling of the PPR includes:

scheduling one of an immediate PPR or a delayed PPR based on a risk level comparison value of the corrected error.

18. The method of claim 16, wherein the scheduling of the PPR includes:

scheduling one of a software PPR or a hardware PPR based on a risk level comparison value of the corrected error.

19. An electronic device comprising:

a basic input output system (BIOS) device including a nonvolatile memory storing a BIOS;

a storage device configured to store an operating system;

a chipset connected with the BIOS device and the storage device;

a memory module including at least one dynamic random access memory; and a processor connected with the chipset and the memory module, wherein, in a power-on, the processor is configured to:

load the BIOS from the BIOS device through the chipset; and load the operating system from the storage device through the chipset, and wherein, in response to a corrected error occurring when the processor accesses the memory module, the BIOS and/or the processor is configured to:

determine a risk level of the corrected error by reading an error log of the corrected error;

determine whether the corrected error is a temporary error based on a number of occurrences of a read error in a read retry operation;

determine the risk level of the corrected error to be low in response to determining that the corrected error is a temporary error;

determine the risk level of the corrected error to be high in response to determining that the corrected error is not a temporary error; and register an address of the corrected error at a post package repair (PPR) address list regardless of the corrected error count of the corrected error, in response to the risk level of the corrected error being high.

* * * * *